Patented Oct. 14, 1947

2,428,896

UNITED STATES PATENT OFFICE 2,428,896

PIGMENTED GEL COMPOSITION

Harry A. Toulmin, Jr., Oakwood, Ohio, assignor to Chemical Developments Corporation, Dayton, Ohio, a corporation of Ohio No Drawing. Application March 9, 1945, Serial No. 581,941

8 Claims. (Cl. 106—209)

This invention deals with the production of a pigmented gel adapted to be incorporated into resins, rubber, plastics, lacquers, varnishes, paints, enamels, cements, linoleum, and the like.

It is an object of this invention to provide a gel in which a dye or pigment is uniformly dispersed so as to form a homogeneous product.

Another object of this invention is to provide a pigmented gel in which the dye or pigment is physically bound to the gel so that it is resistant to external influences and capable of being stored for a long period of time without decomposing or losing its homogeneous character.

Another object of this invention is to devise a process and product comprising a pigmented gel in which coloring matter is dispersed throughout the gel without requiring grinding of the pigment or dye therein so as to form a homogeneous, uniformly colored product.

Another object of this invention is to provide a pigmented gel which can be shipped without the addition of solvents whereby the user can incorporate the gel with or without solvent and other constituents as are required to produce the desired composition.

In general, this invention involves the production of a pigmented gel wherein the coloring matter is dispersed throughout the mass without requiring protracted grinding of the pigment with the vehicle. This is broadly accomplished by coating a hydrophilic colloid, preferably starch, with the pigment, dye or other coloring matter in a liquid medium that does not affect the hydrophilic colloid, such as alcohol in the case of starch. The pigment-coated hydrophilic colloid is thereafter separated from the liquid, which may be immediately used again for preparing a new batch. The pigment-coated colloid is then incorporated into an oil-water emulsion. The water of the emulsion makes the particles of the hydrophilic colloid swell, and the pigment coating the surface thereof is thereby dispersed throughout the oil. After the dispersion has been completed the water is removed from the batch. A pigmented gel is thus obtained that is characterized by its uniform pigment distribution and by its stability during storage and shipping.

In order to illustrate this invention further, the following example of the procedure to be followed in producing the product and process of this invention is given:

*Example*

1-15 parts by weight of a hydrophilic colloid are mixed with 100 parts of 95% alcohol, and 2-20 parts by weight of comminuted coloring matter are added thereto. The particles of the hydrophilic colloid become coated by the pigment practically immediately. After about 30-60 minutes, when the reaction is completed and the pigment-coated colloid particles have precipitated at the bottom of the container, the alcohol is separated from the precipitate by decanting or by other conventional methods. The alcohol may be used again without any treatment for preparing a new batch of pigment-coated colloid.

The precipitate is thereafter thoroughly mixed with an oil-water emulsion. The quantity of this emulsion depends upon the consistency desired in the final pigmented gel product. In contact with the water of this emulsion the colloid swells whereby the pigment absorbed on the surface of the colloid particles is dispersed throughout the mixture. Thereafter the water is removed from the product by mechanical or thermal means or by a combination of both. Thus, the bulk of the water is advantageously removed by exertion of mechanical pressure on the product or by applying a vacuum, both with or without heating. The last quantities of moisture, however, are preferably evaporated by applying heat. The product thus obtained is a homogeneous oil-containing gel in which the pigment is uniformly distributed and which has a high degree of stability due to the bonding or absorptive capacity of the colloid.

It will be appreciated that hydrophilic colloids other than starch may be used. Thus, for example, flour in particular corn and rice flour, gums or glue, have been found suitable for the process of my invention.

In preparing the pigment-coated colloid suspension, liquid media other than alcohol may be used if they do not react with the colloid.

My process is adaptable to all kinds of coloring matter, and pigments, such as zinc oxide, lithophone, iron oxide, chrome green, carbon black, lamp black, and organic dyes may be incorporated into a gel according to my invention. The coloring matter is insoluble in oil, water or the colloid.

For preparing the oil-water emulsion, any oil emulsifiable with water is suitable. The factor of prime importance for determining the kind of oil to be used is the application for which the pigmented gel is intended.

It will be understood that the water derived from the oil-water emulsion may be removed from the final product by any suitable means known in the art. When heat is applied for this purpose, however, care has to be taken that the temperature chosen is below that at which decomposition of the pigment or of the gel or surface changes of the gel occur. In order to avoid such harmful temperatures and make the water evaporation possible at lower temperatures, heating under vacuum is often advisable.

The product and process of my invention may be modified by the addition of a gelling agent; this, however, is not compulsory. Gelling agents such as stearate and palmitate metallic soaps have proven suitable.

Another ingredient which may be optionally incorporated into the pigmented gel of my invention is a deflocculating agent. Substances commonly used as deflocculating agents and suitable for my products are for example fatty acid soaps, stearic acid, abietic acid, benzoic acid, phthalic acid, lecithin and diglycol laurate. The deflocculating agent may be added to the oil-water suspension before or after it has been mixed with the pigment-coated colloid. Better results, however, are obtained if the pigment is coated with such a deflocculating agent prior to its admixture with the colloid suspension. The coating of the pigment with the deflocculating agent is preferably performed in vacuum.

In order to give the pigmented gel more body, resin may be incorporated therein. Natural as well as synthetic resins, such as phenol formaldehyde resins, alkyd resins, rosin, etc. are usable. In most cases the stability of the pigmented gel is still further increased by the addition of resin. The incorporation of the resins is advantageously carried out while heating and stirring the mixture in order to obtain a uniform distribution.

It will be understood that this invention provides a uniform homogeneous pigmented gel of great stability which may be used in various arts when coloring matter is required to be incorporated.

It will also be understood that this invention is not limited to the specific details given and that the process may be varied to accommodate different conditions and uses to which the product is to be subjected.

I claim:

1. A process for producing a pigmented gel composition comprising the steps of mixing an organic hydrophilic colloid with alcohol; adding coloring matter which is insoluble in oil, water or the colloid thereto whereby said colloid is coated with said coloring matter; separating said coated colloid from said liquid medium; adding an oil-in-water emulsion to said coated colloid whereby the water reacts with said hydrophilic colloid and causes it to swell and the coloring matter held on its surface to become dispersed throughout the mixture; and removing the water from the mixture whereby a uniformly pigmented homogeneous gel is obtained.

2. A process for producing a pigmented gel composition comprising the steps of mixing starch with alcohol; adding coloring matter which is insoluble in oil, water or the colloid thereto whereby said starch is coated with said coloring matter; separating said coated starch from said liquid medium; adding an oil-in-water emulsion to said coated starch whereby the water reacts with said starch and causes it to swell and the coloring matter held on its surface to become dispersed throughout the mixture; and removing the water from the mixture whereby a uniformly pigmented homogeneous gel is obtained.

3. A process for producing a pigmented gel composition comprising the steps of mixing an organic hydrophilic colloid with alcohol; adding coloring matter which is insoluble in oil, water or the colloid thereto whereby said colloid is coated with said coloring matter; separating said coated colloid from said liquid medium; adding an oil-in-water emulsion to said coated colloid whereby the water reacts with said hydrophilic colloid and causes it to swell and the coloring matter held on its surface to become dispersed throughout the mixture; and removing the water from the mixture under vacuum whereby a uniformly pigmented homogeneous gel is obtained.

4. A process for producing a pigmented gel composition comprising the steps of mixing an organic hydrophilic colloid with alcohol; adding a mixture of gelling agent selected from the group consisting of stearate and palmitate metallic soaps and coloring matter which is insoluble in oil, water or the colloid thereto whereby said colloid is coated with said coloring matter; separating said coated colloid admixed with said gelling agent from said liquid medium; adding an oil-in-water emulsion to said colloid containing mixture whereby the water reacts with said hydrophilic colloid and causes it to swell and the coloring matter held on its surface to become dispersed throughout the mixture; and removing the water from the mixture whereby a uniformly pigmented homogeneous gel is obtained.

5. A process for producing a pigmented gel composition comprising the steps of mixing an organic hydrophilic colloid with alcohol; adding a mixture of deflocculating agent and coloring matter which is insoluble in oil, water or the colloid thereto whereby said colloid is coated with said coloring matter; separating said coated colloid admixed with said deflocculating agent from said liquid medium; adding an oil-in-water emulsion to said colloid containing mixture whereby the water reacts with said hydrophilic colloid and causes it to swell and the coloring matter held on its surface to become dispersed throughout the mixture; and removing the water from the mixture whereby a uniformly pigmented homogeneous gel is obtained.

6. A process for producing a pigmented gel composition comprising the steps of mixing an organic hydrophilic colloid with alcohol; separately coating coloring matter which is insoluble in oil, water or the colloid with a deflocculating agent and adding said coated coloring matter to said colloid suspension whereby said colloid is coated with said coloring matter covered with said deflocculating agent; separating said coated colloid from said liquid medium; adding an oil-in-water emulsion to said colloid containing mixture whereby the water reacts with said hydrophilic colloid and causes it to swell and the coloring matter held on its surface to become dispersed throughout the mixture; and removing the water from the mixture whereby a uniformly pigmented homogeneous gel is obtained.

7. A process for producing a pigmented gel composition comprising the steps of mixing an organic hydrophilic colloid with alcohol; separately coating coloring matter which is insoluble in oil, water or the colloid with a deflocculating agent under vacuum and adding said coated coloring matter to said colloid suspension whereby said colloid is coated with said coloring matter covered with said deflocculating agent; separating said coated colloid from said liquid medium; adding an oil-in-water emulsion to said colloid containing mixture whereby the water reacts with said hydrophilic colloid and causes it to swell and the coloring matter held on its surface to become dispersed throughout the mixture; and removing the water from the mixture whereby a uniformly pigmented homogeneous gel is obtained.

8. A process for producing a pigmented gel composition comprising the steps of mixing an organic hydrophilic colloid with alcohol; adding coloring matter which is insoluble in oil, water or the colloid thereto whereby said colloid is coated with said coloring matter; thoroughly mixing a resin into said coloring matter containing suspension; separating said coloring matter-colloid-resin mixture from said liquid medium; adding an oil-in-water emulsion to said coloring matter-colloid-resin mixture whereby the water reacts with said hydrophilic colloid and causes it to swell and the coloring matter held on its surface to become dispersed throughout the mixture; and removing the water from the mixture whereby a uniformly pigmented homogeneous gel is obtained.

HARRY A. TOULMIN, JR.

REFERENCES CITED

The following references are of record in the file of this patent:

UNITED STATES PATENTS

| Number | Name | Date |
|---|---|---|
| 2,347,680 | Gaver | May 2, 1944 |
| 2,135,936 | Gamble et al. | Nov. 8, 1938 |
| 2,205,985 | LaPointe | June 25, 1940 |
| 2,194,216 | Coppock | Mar. 19, 1940 |